United States Patent Office 3,494,005
Patented Feb. 10, 1970

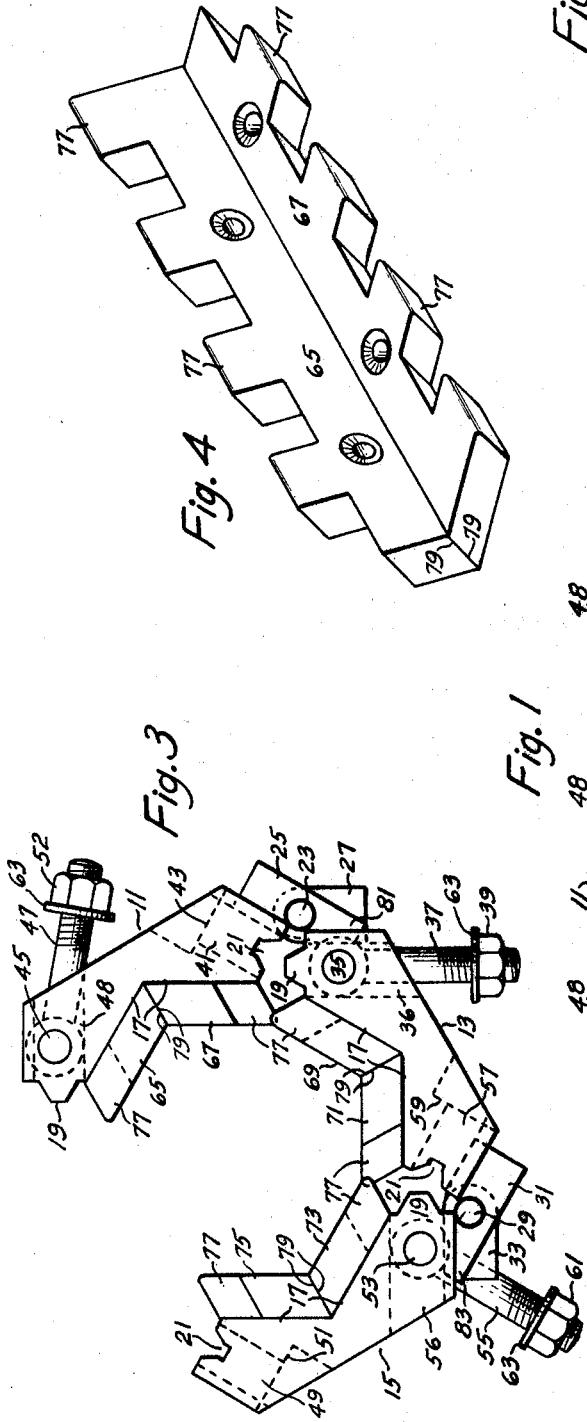
INVENTORS
Stephen R. Baker
William J. Pearson (Deceased)

3,494,005
PULLING CLAMP FOR PARALLEL WIRE STRAND
Stephen R. Baker, Oley, Pa., and William J. Pearson, deceased, late of Bethlehem, Pa., by Dritha D. Pearson, administratrix, Bethlehem, Pa., assignors to Bethlehem Steel Corporation, a corporation of Delaware
Filed Sept. 21, 1967, Ser. No. 670,025
Int. Cl. F16l 11/00
U.S. Cl. 24—122.6                 2 Claims

ABSTRACT OF THE DISCLOSURE

Three clamping jaws each having two internal clamping surfaces inclined at 120 degrees to each other are pivoted together by two loosely fitting hinges. The edge of each jaw interfits with the adjoining jaws to provide precise alignment of the sections when they are drawn tightly together by hinged tension bolts which draw the three sections together uniformly from all sides. The force of each tension bolt is exerted substantially parallel to an axis passing at right angles through opposed clamping surfaces. The actual clamping surfaces are composed of interlocking inserts.

BACKGROUND OF THE INVENTION

This invention pertains to the clamping of hexagonal parallel wire strand.

A recent development in suspension bridge construction involves the formation of parallel wire strands away from the bridge site, each strand containing a large number of wires. The completed strands are transported to the bridge site and erected in place to form the bridge cables. The strands are formed by pulling the requisite number of individual wires through a hexagonal forming die as shown in application Ser. No. 575,038 filed Aug. 25, 1966 by J. L. Durkee et al.

In order to pull the wires through the die evenly to form a balanced strand it is necessary to securely grip the strand beyond the forming die so that there is no longitudinal or rotational slippage of the individual wires relative to each other.

SUMMARY OF THE INVENTION

The present invention provides a clamp especially adapted to provide even clamping pressure from all sides of a hexagonal clamping device in order to exert a uniform clamping action upon all the internal as well as external wires of the strand.

The device comprises a tri-sectional clamp, each section having two clamping surfaces disposed at 120 degrees to each other, the three sections being adapted to be fitted together with adjacent clamping surfaces on adjoining sections also disposed at 120 degrees with respect to each other. The sections are loosely hinged together for quick application and removal to and from a strand and are drawn forcibly towards each other by the action of tension bolts securing the sections together.

BRIEF DESCRIPTION OF THE DRAWING

FIGURE 1 is a side view of the clamp.
FIGURE 2 is an end view of the clamp.
FIGURE 3 is an end view of the clamp opened.
FIGURE 4 shows two inserts positioned together as they are in the clamp.

DESCRIPTION OF THE PREFERRED EMBODIMENT

The clamp of the present invention is comprised of three jaw members 11, 13 and 15. As shown in FIGURES 2 and 3 each jaw member has gripping faces 17, 17 diverging at an angle of 120 degrees. One edge of each jaw member 11, 13 and 15 has a projection 19 intercalated with a groove 21 on an opposite edge of an adjacent jaw member.

Jaw member 11 is loosely connected to jaw member 13 by hinge pins 23 passing through ears 25 and 27 mounted on jaw members 11 and 13 respectively. Jaw member 13 is likewise loosely connected to jaw member 15 by hinge pins 29 passing through ears 31 and 33 on jaw members 13 and 15 respectively.

Mounted exteriorly of jaw 13 adjacent one side thereof is a pivot pin 35 on which are pivotally mounted in slots 36 tension bolts 37 provided with tension nuts 39. Tension bolts 37 are accommodated in operative position in slots 41 in the sides of jaw member 11 contiguous to slots 36 in jaw 13 so that tension nuts 39 may be drawn tight against shoulders 43 on jaw member 11.

Similarly jaw 11 is provided with pivot pins 45 on which tension bolts 47 are mounted in slots 48, while jaw 15 is provided with slots 49 and shoulders 51 against which tension nuts 52 may be tightened. Jaw 15 is likewise provided with pivot pin 53 on which bolts 55 are mounted in slots 56 while jaw 13 is provided with slots 57 and shoulders 59 against which tension nuts 61 may be tightened.

Each hinged tension bolt 37, 47 and 55 is provided not only with a tension nut 39, 52, or 61 but also a washer 63 to facilitate rotation of the nuts against their respective shoulders.

A series of inserts 65, 67, 69, 71, 73 and 75 are preferably mounted against the gripping faces 17 of each jaw by suitable securing means such as machine screws 76 shown in dotted outline in FIGURE 2. Each insert has a planar rear edge 79 which is butted against the rear planar edge of an adjacent insert as seen in FIGURE 4 in the angle of the two clamping surfaces of each jaw 11, 13, or 15 as for example inserts 65 and 67 are abutted together in the angle of the gripping faces of jaw 11 as seen in FIGURE 2. Each insert also has a series of alternating fingers 77 along the opposite edge which, when the clamp is closed, intercalate with the fingers on the insert on the adjoining jaw. As an example the fingers of insert 65 on jaw 11 are seen in FIGURE 2 to intercalate with the fingers of insert 75 on jaw 15.

Different sized inserts may be mounted on the gripping faces 17 of the jaws to adapt the clamp to different sized strands. Shim stock may be inserted behind the inserts to adjust for fine variations in dimensions.

Extensions 81 and 83 on one side of each of ears 25 and 31 respectively bear against the outer surface of jaws 13 and 15 respectively adjacent ears 27 and 33 when the clamp is opened in order to prevent the clamp from opening more than is necessary to place it over the strand to be clamped.

It is obvious that jaws 11, 13 and 15 can be swung open on hinge pins 23 and 29 to receive a strand and then can be shut to enclose the strand. Tightening tension nuts 39, 52 and 61 fastens the clamp securely to the strand. It will be noted in FIGURE 2 that each of the tension bolts 37, 47 and 55 when the clamping position is substantially parallel to an imaginary line passing at right angles through diametrically opposed gripping faces on the two jaw sections drawn together by each respective bolt. For example tension bolt 37 is parallel to an axis normal to the clamping faces 17 of jaws 11 and 13 upon which inserts 65 and 71 are secured. When the two sets of tension bolts securing each jaw to the other two jaws are tightened the resultant force draws the jaw section and its two gripping faces directly toward the intersection of the two opposite gripping faces at the intersection of the other two jaws, with a sizable component of the clamping force drawing the opposed faces directly towards each other. The arrangement of the clamp provides an extremely effective clamping action on a hexagonal strand which effectively places an equal clamping force on all the wires of the strand and also compensates for possible uneven tightening of the tension bolts. Hinge pins 23 and 29 fit sufficiently loosely in ears 25 and 27 and 31 and 33 to allow tension bolts 37, 47 and 55 to draw jaws 11, 13 and 15 together against a strand.

In the use of the clamp to draw the strand through a forming die the clamp will usually be mounted on a carriage or the like moved by any suitable means. Various other means may be used for pulling the clamp, however. Several clamps may be used on a long strand so that at least one clamp is always gripping the wires of the strand while another clamp is moved forward on the strand to obtain a new grip.

What is claimed is:

1. A clamp for a parallel wire strand of hexagonal cross section comprising:
   (a) three jaw members,
   (b) each jaw member having two inner strand-gripping faces diverging at an angle of 120 degrees,
   (c) hinges pivotally connecting one jaw member with an adjacent jaw member in a relationship such that said jaw members when pivoted to operative clamping position define a hexagonal internal orifice having three pairs of diametrically opposed planar gripping faces disposed parallel to each other,
   (d) a tension bolt mounted on each jaw member for pivotal movement about an axis parallel to the axes of the hinges,
   (e) a slot on each jaw member for receiving the bolt of an adjacent jaw member,
   (f) each slot terminating in a shoulder for engagement with a nut threaded on the bolt,
   (g) each of said hinged tension bolts when in operative clamping position being substantially parallel to an imaginary line passing at right angles through a pair of said diametrically opposed gripping faces on the jaw members held together by the respective tension bolts and adapted when tightened in combination with the other tension bolts to move the said gripping surfaces evenly against the sides of a hexagonal parallel wire strand to securely and evenly grip both the internal and external wires of hexagonal parallel wire strand within said internal orifice from three directions and prevent any longitudinal displacement of the wires with respect to each other.

2. The clamp of claim 1 wherein the hinges connecting one jaw member with an adjacent jaw member are provided with a loose fit and additionally comprising:
   (h) aligning means along the opposed edge of each jaw positioned nearest each adjoining jaw member and intercalated with cooperating aligning means on each adjoining jaw member.

References Cited

UNITED STATES PATENTS

| | | |
|---|---|---|
| 1,614,581 | 1/1927 | Wright. |
| 1,649,390 | 11/1927 | Crotto _____ 24—135 |
| 1,674,952 | 6/1928 | Crotto. |
| 2,183,526 | 12/1939 | Abegg. |
| 2,527,954 | 10/1950 | Nixon. |
| 3,248,684 | 4/1966 | Hubbard _____ 24—135 X |

FOREIGN PATENTS 82,641    2/1920    Switzerland.

BERNARD A. GELAK, Primary Examiner

U.S. Cl. X.R.

14—22; 24—125, 249